May 9, 1967 — J. M. SNODGRASS — 3,319,094

LOW-TORQUE ELECTRIC GENERATOR

Filed Feb. 17, 1964

INVENTOR.
JAMES M. SNODGRASS
BY Fulwider, Patton,
Rieber, Lee & Utecht
ATTORNEYS

# United States Patent Office 3,319,094
Patented May 9, 1967

3,319,094
LOW-TORQUE ELECTRIC GENERATOR
James M. Snodgrass, La Jolla, Calif., assignor to The Regents of the University of California
Filed Feb. 17, 1964, Ser. No. 345,313
5 Claims. (Cl. 310—68)

The present invention relates to a low torque electric machine. The principal embodiment discloses a low torque direct current generator.

There are obviously many uses for a direct current generator which does not require a high operating or starting torque. The low torque characteristic is particularly desirable in applications where the relative motion required by the generator is being produced by forces caused by low power sources such as winds or ocean currents.

The low torque characteristic of this invention is attributable to the fact that the electrical and magnetic components are arrayed to interreact such that when any portion of the plurality of magnetic flux producing elements and electromagnetic elements are magnetically interreacting so as to instantaneously produce the maximum resistance to relative motion between the elements, the remaining elements are magnetically interreacting so as to produce forces which are instantaneously in static equilibrium and therefore offering no resistance to relative motion.

Other features and advantages of the present invention will be apparent from the following description, reference being made to the accompanying drawings wherein preferred embodiments of the invention are illustrated.

Figure 1:
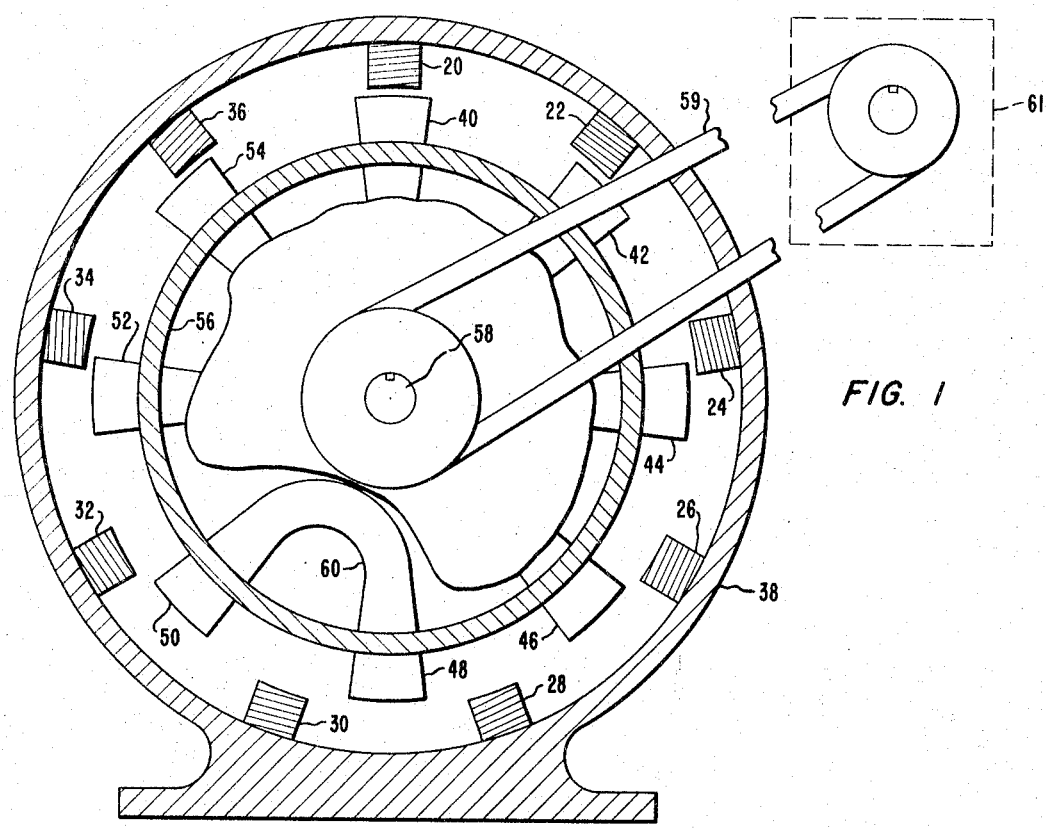
FIG. 1 is an end view of a rotating low torque generator.
Figures 2, 3:
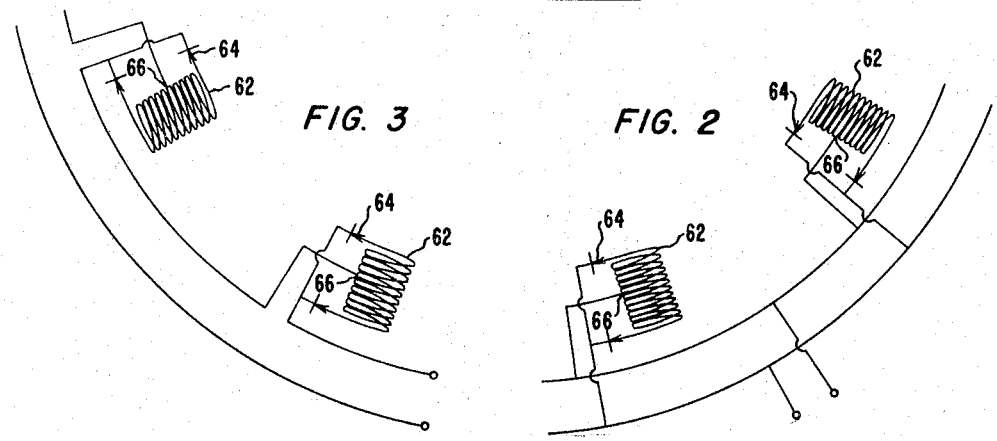
FIG. 2 is a diagrammatic drawing showing two of the electric coils wired in parallel.
FIG. 3 is a diagrammatic drawing showing two of the electric coils wired in series.

Referring in detail to the drawings, FIG. 1 illustrates a rotating low torque generator. Electromagnetic elements 20, 22, 24, 26, 28, 30, 32, 34 and 36 are equally spaced from one another, disposed around a circle, and held by holding means 38. There are nine electromagnetic elements shown in FIG. 1. The electromagnetic elements are similar to conventional generator coils in that they are comprised of wire wrapped around a core material having a high magnetic permeability. Other characteristics of the coils are illustrated in FIGS. 2 and 3 which are discussed infra.

The magnetic flux producing elements 40, 42, 44, 46, 48, 50, 52 and 54 are shown equally spaced from one another disposed around a circle, and held by holding means 56. The holding means is rotated by the pulley 58 which is driven by the belt 59, which belt is driven by any form of prime mover, herein shown diagrammatically at 61. Adjacent elements have opposite polarity, that is, the magnetic flux at the outer surface of adjacent elements is flowing in opposite directions. Or, in more familar language, taking the elements in sequence around the periphery of the holding means 56, they are alternately north and south poles. For example, if poles 40, 44, 48 and 52 are south poles, then poles 42, 46, 50 and 54 would be north poles. This alternation of polarity requires that there be an even number of elements in the rotating type of generator.

The magnetic flux producing elements could be permanent magnets, or electromagnetic magnets, and are herein shown as U-shaped permanent magnets, one of which is shown at 60.

The low torque characteristic of the present invention is explained as follows: When a magnetic flux producing element and an electromagnetic element are directly opposing, they offer the maximum resistance to relative motion between one another. Therefore, in FIG. 1, elements 40 and 20, which directly oppose one another, magnetically interact to offer the maximum resistance to relative motion between the elements 40 and 20. And, as discussed infra, this maximum resistance produced by any opposing flux producing element and electromagnetic element is the only net electrical resistance offered to said relative motion.

When shaft 58 is rotating in the clockwise direction, thereby causing the electromagnetic elements to rotate in clockwise direction, there is a magnetic attraction between elements 42 and 22 which resists clockwise rotation. This resistance offered by elements 42 and 22 is compensated for by the attractive force between elements 54 and 36. This cancellation of forces exists for all electromagnetic elements and flux producing elements except 20 and 40. For example the force between 32 and 50 is cancelled by the force between 26 and 46. Thus the maximum resistance to relative motion that can be developed, is that developed by the alignment of one flux producing element and one electromagnetic element.

FIGS. 2 and 3 show portions of the electrical circuitry which would yield a direct current output. Both figures show electric coils 62 with rectifiers 64 and center taps 66. The electric output of coils 62 for the circuitry shown in FIGS. 2 and 3 would be a direct current output. FIG. 2 shows the coils 62 interconnected in parallel, whereas, FIG. 3 shows them interconnected in series.

It should be apparent that a direct current output is the most practical output for this low torque generator. However, this invention is easily adapted for use as an alternating current generator.

The foregoing describes a method of reducing the effective magnetic force resistance to the relative motion between the moving and stationary parts of electric machines. While foregoing discussion refers to generator, the same principles can be used for a low torque motor. While in a generator, the maximum flux relationship is of efflux characteristic when one of the movable flux producing elements is directly opposite a stationary flux producing element, whereas in a motor, the maximum flux relationship is of afflux characteristic when one of the movable flux producing elements is directly opposite a stationary flux producing element.

While the forms of embodiment herein shown and described constitute preferred forms, it is understood that other forms may be adopted falling within the scope of the claims that follow.

I claim:
1. A generator unit comprising:
   (A) a rotary support assembly including a stator unit and a rotor unit which has an annular space therebetween;
   (B) a plurality of equally spaced flux producing members mounted on one of said units and projecting into said annular space, the adjacent members being of opposite polarity; and
   (C) a plurality of equally spaced electromagnetic elements having a core surrounded by a coil, which are disposed on the other of said units, projecting into said annular space in close non-interfering proximity to the said flux producing members, said electromagnetic elements being connected to electrical output terminals;
   (D) said flux producing members and said electromagnetic elements having different center to center distances and disposed with respect to each other so that only one of the magnetic flux producing members is disposed at any given time in direct alignment with an electromagnetic element; and

(E) all of the magnetic flux producing members on either side of the said one aligned magnetic flux producing member are symmetrically arranged with respect thereto and are displaced out of direct alignment with their corresponding electromagnetic elements an equal distance to thereby balance the attractive and repulsive forces coincident with these displaced electromagnetic elements.

2. A generator unit as set forth in claim 1, wherein:
(A) the total of magnetic flux producing members being an even number and one less than the number of electromagnetic elements.

3. A generator unit as set forth in claim 1, wherein:
(A) the magnetic flux producing members are mounted on the rotor unit.

4. The generator unit as set forth in claim 1, wherein:
(A) rectifying means is associated with each coil for producing a unidirectional electrical output.

5. A generator unit as set forth in claim 4, wherein:
(A) said coil elements are connected in series.

References Cited by the Examiner

UNITED STATES PATENTS

| | | | |
|---|---|---|---|
| 2,232,097 | 2/1941 | Deal | 310—46 |
| 2,553,298 | 5/1951 | Brunelle | 310—154 |
| 2,702,867 | 2/1955 | Wightman | 310—168 |
| 2,768,359 | 10/1956 | Side | 310—168 |
| 2,843,768 | 7/1958 | McConnell | 310—68 |
| 2,939,024 | 5/1960 | Takaichi Mabuchi | 310—154 |
| 3,217,194 | 11/1965 | Terry | 310—68 |

FOREIGN PATENTS 557,641   5/1942   Great Britain.

MILTON O. HIRSHFIELD, *Primary Examiner.*

J. D. MILLER, *Assistant Examiner.*